(12) United States Patent
Chen et al.

(10) Patent No.: US 11,479,475 B2
(45) Date of Patent: Oct. 25, 2022

(54) METHOD OF PREPARING INDIUM OXIDE SPHERICAL POWDER

(71) Applicant: Zhengzhou University, Zhengzhou (CN)

(72) Inventors: Jie Chen, Zhengzhou (CN); Jilin He, Zhengzhou (CN); Benshuang Sun, Zhengzhou (CN); Yongchun Shu, Zhengzhou (CN); Xueyun Zeng, Zhengzhou (CN); Yang Liu, Zhengzhou (CN)

(73) Assignee: ZHENGZHOU UNIVERSITY, Henan (CN)

(*) Notice: Subject to any disclaimer, the term of this patent is extended or adjusted under 35 U.S.C. 154(b) by 316 days.

(21) Appl. No.: 15/931,269

(22) Filed: May 13, 2020

(65) Prior Publication Data

US 2021/0276879 A1    Sep. 9, 2021

(30) Foreign Application Priority Data

Mar. 6, 2020 (CN) .......................... 202010151073.6

(51) Int. Cl.
*C01G 15/00* (2006.01)

(52) U.S. Cl.
CPC .......... *C01G 15/00* (2013.01); *C01P 2002/70* (2013.01); *C01P 2004/03* (2013.01); *C01P 2004/04* (2013.01); *C01P 2004/32* (2013.01)

(58) Field of Classification Search
CPC ..................................................... C01G 15/00
See application file for complete search history.

(56) References Cited

FOREIGN PATENT DOCUMENTS

KR    20170027588    *    3/2017

* cited by examiner

*Primary Examiner* — James A Fiorito
(74) *Attorney, Agent, or Firm* — Hauptman Ham, LLP (57) ABSTRACT

A method of preparing an indium oxide spherical powder with a controllable grain shape includes: (1) reacting a sulfuric acid solution, and then adding a nitric acid solution, to react with the metal indium to obtain a mixed solution system containing indium sulfate and indium nitrate; (2) adjusting a concentration of indium ions in the mixed solution system to between 0.45~0.6M; (3) performing a precipitation reaction of the mixed solution with a precipitant, until a pH value of the solution is between 9~10, and then having the solution precipitated and aged to obtain an indium hydroxide precursor slurry; (4) using a ceramic membrane to filter and wash the precursor slurry, and ending the washing to obtain a purified precursor sample; (5) drying the precursor sample at 80~130° C.; and (6) ball-milling the precursor sample, and calcining the precursor at a calcination temperature to obtain the indium oxide powder.

9 Claims, 5 Drawing Sheets

METHOD OF PREPARING INDIUM OXIDE SPHERICAL POWDER

CROSS-REFERENCE TO RELATED PATENT APPLICATION

This application claims priority to and the benefit of CN 202010151073.6, filed Mar. 6, 2020, entitled "Method of Preparing Indium Oxide Spherical Powder with Controllable Grain Shape," by Jilin H E et al. The entire disclosure of the above-identified application is incorporated herein by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

TECHNICAL FIELD

The present application relates to the technical field of oxide powder preparation, and specifically relates to a method of preparing an indium oxide spherical powder with a controllable grain shape.

BACKGROUND

Indium oxide ($In_2O_3$) is an important n-type semiconductor material with a direct energy band gap of 3.55-3.75 eV and an indirect energy band gap of 2.5 eV. It has a fairly wide forbidden band width, a rather small resistivity and a relatively high catalytic activity. At room temperature, it is light yellow and its crystal form is mainly cubic and hexagonal. In the internal structure of its crystal, there are many interstitial ions and oxygen vacancies, providing many sites for physical adsorption, chemical adsorption, reaction and conversion, as well as channels for electron transfer. In the field of optoelectronics, and the aspects of gas sensors and catalysts, it has broad application prospects, for example, the application in the field of optoelectronic thin-film materials. $In_2O_3$-based magnetron sputtering ceramic targets have been widely used in solar cells, optoelectronic devices, liquid crystal displays and etc. Besides, as a gas sensor material, research on the use of $In_2O_3$ as a gas-sensitive material for the detection of $H_2$, $O_3$, $NO_2$, CO, $H_2S$ and other gases has made progress presently, thereby making $In_2O_3$ one of the most promising materials in the field of gas sensors.

At present, the preparation methods of indium oxide mainly include the gas phase method, the liquid phase method and the solid phase method. The chemical precipitation method in the liquid phase method is an attractive method, which adds ammonia water from the outside. The process is simple, has a short cycle, and is easy to operate, with low equipment requirements, low investment, and low production cost, being fairly suitable for large-scale production and thus being widely used. However, in the specific preparation process, the liquid phase precipitation method is prone to many problems, such as agglomeration, a slow reaction rate, an unstable reaction system, powder particles with irregular shapes, and etc.

For the powder material with main component of indium oxide, used by indium tin oxide (ITO) for flat panel display, its preparation method usually uses a single acid reaction, and then a precipitation treatment is performed. Dissolving with hydrochloric acid, the reaction speed is fast, but the precursor obtained by precipitation is easy to grow into needle, strip or plate crystals that are not conducive to sintering, and the chloride ion in the precursor is difficult to remove. The washing process is cumbersome, and the impurity content of the product after calcination is high. For the powder used as a magnetron sputtering target, in the later sintering process, intermediate chloride residues are easily formed in the target, thus affecting the sputtering coating performance. As for single nitric acid or sulfuric acid method, because the reaction speed of nitric acid and sulfuric acid and the state of the resulting supersaturated solution are quite different, it is difficult to control the particle size and shape of the indium hydroxide precursor when synthesizing the indium hydroxide precursor with a single acid system. The particle size of the final product obtained is inconsistent, showing a plate or needle shape.

Therefore, a heretofore unaddressed need exists in the art to address the aforementioned deficiencies and inadequacies.

SUMMARY

In order to solve at least one of the technical problems in the technique mentioned above, the embodiments of the present application adopt the process of "nitric acid+sulfuric acid method" to prepare indium oxide powder for the problem of precipitation method in the preparation of indium oxide powder. The preparation system is stable, the reaction speed and the powder morphology are easy to control, the equipment is easy to obtain and easy to operate, the process is simple, and the quality of the prepared product is good.

Specifically, the method of preparing an indium oxide spherical powder with a controllable grain shape disclosed in the embodiments of the present application comprises the following actions to:

(1) React a sulfuric acid solution, which has a concentration of 35~50%, with metal indium for a certain period of time, and then add a nitric acid solution, which has a concentration of 65~68%, to react with the metal indium, to obtain a mixed solution system containing indium sulfate and indium nitrate;

(2) Adjust a concentration of indium ions in the mixed solution system between 0.45~0.6M;

(3) Perform a precipitation reaction of the mixed solution system with a certain concentration of precipitant until the pH value of the solution system is between 9~10, and then have the solution precipitated and aged for a certain time to obtain an indium hydroxide precursor slurry;

(4) Use a ceramic membrane to filter and wash the precursor slurry, until the pH value of the washed filtrate is between 7~8 and its conductivity is less than or equal to 50 µS/cm, and end the washing to obtain a purified precursor sample;

(5) Dry the purified precursor sample at 80~130° C.;

(6) Ball-mill the dried precursor sample, and then calcine the ball-milled precursor at a set calcination temperature to obtain indium oxide powder.

In the method of preparing an indium oxide spherical powder with a controllable grain shape disclosed in some embodiments, volume ratio of the nitric acid solution to the sulfuric acid solution is set to 2:1~1:1.

In the method of preparing an indium oxide spherical powder with a controllable grain shape disclosed in some embodiments, based on the mass of metal indium, the addition rate of nitric acid is controlled between 0.1~0.6 ml/min/g.

In the method of preparing an indium oxide spherical powder with a controllable grain shape disclosed in some embodiments, the action to react a sulfuric acid solution and then add a nitric acid solution, specifically includes the following actions to:

(1-1) Cut an appropriate amount of metal indium into small pieces and put them in a container;

(1-2) Add a sulfuric acid solution, and control the reaction temperature between 70~95° C.;

(1-3) After an interval of 3~10 minutes, add a nitric acid solution at a set rate, and control the reaction temperature between 60~75° C.;

(1-4) After the reaction progresses gradually, stir to obtain a uniform mixed solution.

In the method of preparing an indium oxide spherical powder with a controllable grain shape disclosed in some embodiments, ammonia water is selected as precipitant, wherein a concentration of the ammonia water is set to 25~27%, a temperature of precipitation reaction is controlled between 25~45° C., and a time for precipitating and aging the solution is set to 10~24 hours.

In the method of preparing an indium oxide spherical powder with a controllable grain shape disclosed in some embodiments, the ball mill rotating speed for ball-milling the indium hydroxide precursor sample is set to 180~300 rpm, and the ball-milling time is set to 15~35 hours.

In the method of preparing an indium oxide spherical powder with a controllable grain shape disclosed in some embodiments, the holding time for calcination of the ball-milled precursor powder material is set to 3~7 hours.

In the method of preparing an indium oxide spherical powder with a controllable grain shape disclosed in some embodiments, the heating rate to the calcination temperature is set to 3~5° C./min.

In the method of preparing an indium oxide spherical powder with a controllable grain shape disclosed in some embodiments, the container includes high borosilicate glass as its inner wall material.

The method of preparing an indium oxide spherical powder with a controllable grain shape, disclosed in the embodiments of the present application, uses a mixed system of sulfuric acid and nitric acid to react with metal indium and regulates the state of the solution. The use of the mixed system makes the reaction speed and morphology of the precursor easy to control, and the use of nitric acid makes it easy to accelerate the dissolution and reaction speed, while the use of sulfuric acid makes it easy to control the morphology of the powder. At the same time, the process selection regulated through the mixed solution system makes the subsequent reaction more uniform and is conductive to the morphological homogenization of the powder. In addition, no dispersant or chelating agent is needed in the preparation process, and less impurity ions are introduced. The process is simple, and the preparation cost is low, being safe and reliable. The product spherical particle has regular morphology, high purity, good dispersion, and excellent crystallization, being an excellent material for preparing target materials.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

DETAILED DESCRIPTION

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

The term "embodiment" is used exclusively herein. Any embodiment described as "exemplary" need not be construed as superior to or better than other embodiments. Unless otherwise specified, the performance index tests in the embodiments of the present application adopt conventional test methods in the art. It should be understood that the terms stated in this application are merely used to describe specific embodiments and are not intended to limit the content disclosed in this application.

Unless otherwise stated, the technical and scientific terms used herein have the same meaning as commonly understood by those skilled in the art. Other test methods and technical means unspecified in this application all refer to the experimental methods and technical means commonly adopted by those skilled in the art.

The terms "substantially" and "approximately" as used in this disclosure are used to describe small fluctuations. For example, they can mean less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. The percentage concentration mentioned in the present disclosure is the mass volume percentage concentration, for example, 30% of nitric acid represents the mass fraction of nitric acid in a certain volume of nitric acid solution, with a unit of %. The molecular formula of indium hydroxide is $In(OH)_3$, and the molecular formula of indium oxide is $In_2O_3$. The molar concentration mol/L mentioned in this disclosure is expressed as M.

In this disclosure including the claims, all conjunctions, such as "including", "comprising", "with", "having", "containing", "involving", "accommodating", etc. are understood to be open, i.e., they mean "including but not limited to". Only the conjunctions "consisting of" and "comprised of" are closed conjunctions.

On the premise of no confliction, the technical features disclosed in the embodiments of the present application can be combined with each other, and the obtained technical solution belongs to the content disclosed in the present application.

In some embodiments, the method of preparing an indium oxide spherical powder with a controllable grain shape comprises the following actions to:

(1) React a sulfuric acid solution of a concentration of 35~50% with metal indium for a certain period of time, and then add a nitric acid solution of a concentration of 65~68% to react with the metal indium, to obtain a mixed solution system containing indium sulfate and indium nitrate; usually, the state of the mixed solution system is regulated by controlling the addition rate of nitric acid, the reaction temperature, the ratio of nitric acid to sulfuric acid, the reaction time and the stirring speed, so that the metal in the solution is completely dissolved to obtain a transparent and uniform solution;

(2) Adjust the concentration of indium ions in the mixed solution system between 0.45~0.6M;

(3) Perform a precipitation reaction of the mixed solution containing indium sulfate and indium nitrate with a certain concentration of precipitant until the pH value of the solution is between 9~10, and then precipitate and age the solution for a certain time to obtain an indium hydroxide precursor slurry;

(4) Use a ceramic membrane to filter and wash the indium hydroxide precursor slurry until the pH value of the washed filtrate is between 7~8 and its conductivity is less than or equal to 50 μS/cm, and then end the washing to obtain a purified precursor sample;

(5) Dry the purified precursor sample at 80~130° C.;

(6) Ball-mill the dried precursor sample, and then calcine the ball-milled precursor at a set calcination temperature to obtain indium oxide powder.

Generally, the dissolution reaction of metal indium in nitric acid is fast, which is not conducive to the control of the morphology of the precursor particles, and is easy to form strip or plate crystals. Metal indium interacts with sulfuric acid solution, and the presence of sulfate radical particles in the reaction solution system is conducive to the formation of spherical powder precursor. But the reaction speed of single sulfuric acid is slow, the metal indium is not easy to dissolve, the reaction is incomplete, and the final product particle sizes are inconsistent. During experiments, the applicant accidentally found to have metal indium mixed and reacted with the sulfuric acid solution and nitric acid solution to form a stable precipitation solution system, which gives play to and takes advantage of the merits of nitric acid and sulfuric acid, and under the joint action of the two, produces a synergy effect of mutual coordination and promotion, thereby effectively controlling the formation speed and morphology of the precursor. However, in the use of hydrochloric acid and sulfuric acid, or hydrochloric acid and nitric acid, as a mixed acid system, the presence of hydrochloric acid therein makes the dissolution reaction of metal indium fast. But the precursor obtained by precipitation tends to grow into needle crystals that are not conducive to sintering, which is not conducive to controlling the product morphology. The chloride ion in the precursor is difficult to remove in the subsequent powdering process, so that the washing process for removing chloride ion is cumbersome, and the impurity content of the product after calcination is high, thus reducing the purity of the final product.

As an alternative embodiment, the concentration of the sulfuric acid solution is set to 35~50%, and nitric acid is the one commonly used in laboratories with a concentration of 65~68%. By controlling sulfuric acid and nitric acid within a reasonable concentration range, it is beneficial to achieve a control on the dissolution rate and the precursor particle morphology. The concentration of sulfuric acid also needs to be controlled within a reasonable range. Higher concentrations of sulfuric acid, such as greater than 50%, have higher oxidizability and dehydration, making the components and the component ratio of the reaction system solution unstable. For lower concentrations of sulfuric acid, such as less than 35%, the low concentrations of hydrogen ions and sulfate radical ions lead to a too slow dissolution reaction, and even the metal indium cannot be completely dissolved. So controlling the concentration of sulfuric acid between 35~50% can control the dissolution reaction of metal indium to proceed gently to achieve the technical effect of completely and uniformly dissolving metal indium. For example, it can be any concentration value within the range of 35~50%, including 35%, 40%, 45%, 50% and etc. At the same time, it is necessary to control the dissolution reaction to be carried out at a certain temperature in order to control the dissolution rate of metal indium, thereby completely dissolving metal indium to obtain a uniform and transparent solution. Experimental results show that the suitable temperature for the reaction of sulfuric acid solution with metal indium is controlled at 70~95° C., such as 70° C., 75° C., 80° C., 85° C., 90° C., 95° C., etc., and any temperature value included in this temperature range, which can well control the reaction speed of metal indium and sulfuric acid, being beneficial to completely dissolving the metal indium to obtain a uniform and transparent solution containing indium ions.

As an alternative embodiment, usually after dissolving and reacting metal indium in the sulfuric acid solution for a certain period of time, nitric acid is added to the reaction solution. Experiments found that the reaction time usually can be controlled between 3~10 minutes, and then nitric acid is added for reaction, which is helpful to control the morphology of the precursor, thereby facilitating control of the morphology of the indium oxide spherical powder.

Generally during experiments, there is no special requirement for the speed of adding sulfuric acid, and the speed of adding sulfuric acid will not affect the reaction speed.

Generally for nitric acid, the addition speed being too fast makes the reaction violent, so that a large amount of heat is released in a short time with the heat accumulation serious, and a large amount of gas is generated instantly, which is easy to cause safety problems and at the same time is easy to cause uneven reaction, a prolonged complete dissolution time, and inefficient dissolution. But, an appropriate addition speed of nitric acid can control the reaction speed in the solution, and the appropriate reaction speed makes the reaction proceed gently, so that the amount of gas generated can be controlled, and the dissolution reaction is uniform and efficient. As an alternative embodiment, the addition speed of nitric acid is controlled between 0.1~0.6 ml/min/g based on the mass of metal indium, that is, the corresponding addition speed of nitric acid per gram of metal is 0.1~0.6 ml/min. For example, given dissolving 30 grams of indium in the experiment, the reaction is uniform and sufficient when the nitric acid addition speed is 3 ml/min, and the complete dissolution time is 3.8 h. When the nitric acid addition speed is respectively 8 and 18 ml/min, the time for complete dissolution of metal indium is 6.5 h and 8.7 h respectively. Indium metal cannot be completely dissolved when the nitric acid addition speed is 100 ml/min Therefore, any rate of the nitric acid addition speed between 0.1~0.6 ml/min/g is a more preferable embodiment.

As an alternative embodiment, usually after the nitric acid solution is added, the temperature of the reaction solution is controlled between 60~75° C., such as 60° C., 65° C., 70° C., 75° C., and any temperature value included within the temperature range, which can well control the reaction speed in the solution. Reactions below 60° C. will result in longer reaction times and increased time costs, and have no more benefit for the dissolution reaction, while reactions above 75° C. will cause the reaction speed to be too fast, and the reaction process will be uneven, leading to incomplete dissolution and reaction of metal indium, which is not conducive to the control of the precursor morphology in the subsequent process.

As an alternative embodiment, the volume ratio of the nitric acid solution that dissolves the metal indium to the sulfuric acid solution is set to 2:1~1:1. In terms of the relative ratio of nitric acid and sulfuric acid, if the proportion of nitric acid is too high, the reaction speed is fast, and the precursor morphology is easy to be irregular and easy to agglomerate. If the proportion of nitric acid is too low, and the proportion of sulfuric acid is too high, the dissolution reaction speed will be too slow, being easy to cause problems such as incomplete dissolution and large difference in precursor particle sizes. Therefore, nitric acid and sulfuric acid need to have a suitable proportional volume to obtain spherical powder particles with small particle size, regular morphology and uniformity.

As an alternative embodiment, the process of reacting a certain concentration of sulfuric acid solution and a certain concentration of nitric acid solution with metal indium and regulating the state of the mixed solution, specifically includes the following actions to:

(1-1) Cut an appropriate amount of metal indium into small pieces and put them in a container; usually, use metal indium ingots as the raw material for preparation, and usually in order to promote the dissolution process, cut the indium ingots into small pieces of suitable size, such as 3~10 mm, put them in a dissolution container, and carry out the dissolution process;

(1-2) Add a sulfuric acid solution with a concentration of 35~50%, and control the reaction temperature between 70~95° C.; usually, according to the mass of metal indium and according to the ratio of nitric acid and sulfuric acid, determine the amount of sulfuric acid and nitric acid with a set concentration, in order to completely dissolve the metal indium. Usually the amounts of sulfuric acid and nitric acid in the experiment are slightly larger than the respective chemical reaction equivalents, so as to completely dissolve the metal indium and shorten the dissolution time; after adding sulfuric acid to the reaction vessel, control the temperature of the reaction solution at 70~95° C., in order to control the dissolution reaction speed;

(1-3) After an interval of 3~10 minutes, slowly add a nitric acid solution with a concentration of 65~68% to control the reaction temperature between 60~75° C.; usually, after the addition of sulfuric acid, wait for the solution to stabilize for a period of time, such as 3~10 minutes, to make it more uniform and stable, and then slowly add nitric acid to the reaction solution in the reaction vessel at the set addition speed. In the process of adding nitric acid, control the temperature of the reaction solution between 60~75° C. to control the reaction speed;

(1-4) Stir, after the reaction progresses gradually, to obtain a uniform mixed solution; stir the solution to accelerate the dissolution process on the one hand and promote the stability and uniformity of the solution on the other hand. For example, use magnetic stirring to stir. As an alternative embodiment, the stirring speed of the magnetic stirring is set to 300~600 rpm.

As an alternative embodiment, the reaction vessel for dissolving metal indium includes high borosilicate glass as its inner wall material. High borosilicate glass has the advantages of no pollution, high temperature resistance, corrosion resistance, fast heating speed and etc. During the dissolution process of metal indium, the introduction of impurity ions can be effectively controlled, being able to significantly improve the physical and chemical properties of the final powder particle product and improve its application performance.

Generally, the concentration of indium ions in the solution has a great influence on the size, morphology and formation process of the solid particles formed during the precipitation of indium ions. For this reason, the concentration of indium ions in the solution can be adjusted in order to achieve a good control on the solid particles. When the indium ion concentration is lower than 0.45M, the particle size is fairly large because the growth rate of the crystal nucleus is higher than the nucleation speed. When the indium ion concentration is higher, the crystal nucleation speed is rather fast at the instant of reaction. Since the nucleation speed is obviously higher than the growth rate of the crystal nucleus, the particle size is fairly small. When the indium ion concentration is higher than 0.6M, due to the high particle density, Brownian motion makes the particles grow due to collision, and at the same time, the phenomenon of particle agglomeration is aggravated. So the indium ion concentration should be controlled within a certain range in order to control the size and morphology of the solid particles formed during the precipitation process, within an expected range. As an alternative embodiment, the concentration of indium ions is controlled between 0.45~0.6M, for example, 0.45M, 0.50M, 0.55M, 0.60M, etc., and any value included in the range.

The precipitation process of metal indium ions in solution is a key phase in the preparation of indium oxide spherical powder materials. This process involves the nucleation, growth, coarsening, agglomeration and the like of the precursor indium hydroxide particles, having a significant influence on the morphology, particle size, dispersion and the like of the indium oxide spherical powder whose final particle shape is controllable, and directly affecting the performance of the sputtering target prepared by using the indium oxide spherical powder. The precipitation phase is closely related to the system and state of the solution before precipitation, which is the internal cause of the specific reaction environment and reaction medium. As the external factors of the reaction, the reaction temperature, the choice of precipitant, concentration of precipitant, pH value of solution, addition speed of precipitant, stirring form, manners of washing and purification and other process conditions during precipitation process directly affect the morphology, particle size, and physical and chemical properties of the indium hydroxide powder. Controlling these process conditions within the optimized range can obtain an indium hydroxide precursor powder with a stable crystal form, high crystallinity, uniform particle size distribution, and low impurity content. The indium hydroxide precursor powder undergoing further calcination process may result in an indium oxide spherical powder.

Generally, after the precipitation reaction of the metal indium ions is completed, the solution containing the indium hydroxide precursor particles can be aged to make the precursor particles have a complete morphology and stable structure.

As an alternative embodiment, ammonia water is selected as the precipitant for the metal indium ion to be subject to the precipitation reaction. Using ammonia water as a precipitant is easy to industrialize and does not introduce other metal ions. However, adding a too low concentration of ammonia water causes the precipitation reaction time to prolong, and the particle size of the precursor particles becomes larger. Adding a high concentration of ammonia water can shorten the reaction time, but the reaction is not thorough. For adding a too high concentration of ammonia water, the solution is strongly gel-like and easy to form colloid, which is not conducive to the filtration, washing and purification of the product, and the powder recovery rate is low. In industrial production, it is required to comprehensively consider the balance between production efficiency and powder performance and select an appropriate ammonia water concentration. As an alternative embodiment, the concentration of ammonia water is set at 25~27%.

In addition, the use of stirring can make the precipitation reaction process more uniform and thorough. As an alternative embodiment, performing appropriate stirring along with the process of adding ammonia water to the solution to perform the precipitation reaction can promote the precursor particles obtained by the precipitation reaction, to be more uniform, and more regular in morphology. For example, the stirring speed can be controlled between 300~600 rpm, thus achieving the desired effect.

As an alternative embodiment, the temperature of the precipitation reaction is controlled between 25~45° C. Generally, the reaction temperature not only affects the speed of precipitation formation, but also has a great influence on the growth rate of the crystal grains already formed. Experiments show that the reaction temperature being less than 25° C. is not conducive to the progress of the reaction, so that the reaction is too slow. As the reaction temperature increases, both the generation and growth rate of the crystal grains will increase, and the higher the temperature, the more frequent collisions between the crystal grains, so that the agglomeration between crystals is also more obvious. When the temperature is higher than 45° C., the agglomeration between crystals is serious, which affects the control of the particle size and morphology.

The pH value of the reaction system has a great influence on the particle size, grain distribution uniformity, morphology, crystal form and agglomeration degree of the particles. When the pH value is too low, the precipitation is incomplete, resulting in material loss. But when the pH value is too high, the particles become larger, which will affect other related properties such as the specific surface area, etc. As an alternative embodiment, it is more appropriate to set the pH value between 9~10. As an alternative embodiment, the pH value of the solution is measured during the process of performing the precipitation reaction with ammonia water, and the reaction is stopped after the set pH value is reached.

Through the aging process, the cubic crystal form of indium hydroxide can be made more complete, and at the same time, the particles can be homogenized again. The aging time being too short will not play a full role. If the aging time is too long, the particles become larger. So the precipitation time should be controlled within a certain range. As an alternative embodiment, the aging time for the solution precipitation is set to 10~24 hours.

Generally, in the resulting $In(OH)_3$ precursor slurry, the precursor particle size is small, the specific surface area is large, and the surface physicochemical effect is strong, so that a variety of anions and cations are likely to remain on the surface of the particle. So, various impurity ions remaining in the precursor should be removed as much as possible, to avoid the influence of the impurity ions on powder properties.

As an alternative embodiment, a ceramic ultrafiltration membrane is used to wash and purify the $In(OH)_3$ precursor slurry to obtain $In(OH)_3$ powder particles with less impurities and high purity. The powder slurry gets rid of the impurity ions in the solution during the process of circulating continuously through the membrane surface of the ceramic ultrafiltration membrane. Compared with the traditional process, the washing process with the membrane technology is performed continuously, with the operating time reduced by 80% and the product recovery rate of ≥99%, so that the amount of washing wastewater is greatly reduced, achieving purification and concentration of the $In(OH)_3$ precursor. Generally, the pH value and conductivity of the filtrate are used as the control conditions for the end of washing. The washing situation of hydroxide ions can be detected by the pH value, and the washing situation of other impurity ions can be detected by the conductivity. For example, one can choose to end the washing when the pH value is between 7~8 and the conductivity is less than or equal to 50 μS/cm, thereby guaranteeing that the impurities are cleaned completely to meet the purity requirements of the product.

Usually, $In(OH)_3$ powder is calcined at a high temperature, dehydrated and decomposed to obtain $In_2O_3$ powder. So the calcination process and equipment conditions are the key factors to characterize the control of $In_2O_3$ powder, which directly affect the indium oxide particle's secondary growth degree, uniformity of particle size distribution, specific surface area, crystal form structure, dispersion and agglomeration of powder. Only by selecting an appropriate calcination curve and controlling an appropriate heating rate, a heat preservation temperature, a holding time, and equipment control conditions, a high-performance powder raw material that satisfies the preparation of ITO targets can be obtained.

As an alternative embodiment, the $In(OH)_3$ powder is usually ground before calcination. For example, the $In(OH)_3$ precursor sample may be ball-milled, with the ball-milling speed set to 180~300 rpm and the ball-milling time set to 15~35 hours. As a more preferred embodiment, the ball-milling speed can be selected to be 220 rpm and the ball-milling time to be 24 hours.

As an alternative embodiment, the holding time for calcination of the ground $In(OH)_3$ powder material is set to 3~7 hours.

As an alternative embodiment, the calcination temperature is set to 800~1100° C., and the heating rate to the calcination temperature is set to 3~5° C./min.

In order to better explain the content of the present application, numerous specific details are given in the specific embodiments below. Those skilled in the art should understand that this application can also be implemented without certain specific details. In the embodiments, some methods, means, instruments, equipment, etc. well-known to those skilled in the art are not described in detail in order to highlight the gist of the present application.

Embodiment 1

The process of preparing indium oxide spherical powder particles with a controllable grain shape disclosed in this embodiment 1 includes:

In some embodiments, the method of preparing an indium oxide spherical powder with a controllable grain shape comprises the following actions or steps to:

(1) Dissolve the metal indium with 35% sulfuric acid solution and 66% nitric acid solution to obtain a mixed solution containing indium ions. The volume ratio of nitric acid to sulfuric acid is set to 2:1. It specifically includes the following actions to:

(1-1) Cut 30 grams of metal indium into small pieces and put them into a dissolution tank;

(1-2) Add the sulfuric acid solution with a concentration of 35%, and control the reaction temperature at 95° C.;

(1-3) After an interval of 5 minutes, slowly add the nitric acid solution at a rate of 3 ml/min, and control the reaction temperature at 75° C.;

(1-4) After the reaction progresses gradually, stir the solution with a magnetic stirrer at a stirring speed of 500 rpm, to obtain a clear and transparent mixed solution.

(2) Adjust, with pure water, the concentration of indium ions in the mixed solution to 0.45M;

(3) Add ammonia water with a concentration of 25% to the mixed solution to have a precipitation reaction, with the reaction temperature controlled at 25° C., until the pH value of the solution is 9.4, and then precipitate and age the solution with the aging time of 10 hours, to obtain indium hydroxide slurry;

(4) Filter and wash, with pure water and through a ceramic membrane, the indium hydroxide slurry; first wash the ceramic membrane with pure water, then put the slurry into a ceramic membrane pressure filter for filtration and washing, and continue to wash with pure water, until the pH value of the washed filtrate is 7.6 and its conductivity is less than 50 μS/cm, and end the washing, to obtain a solid sample of indium hydroxide;

(5) Put the washed solid sample of indium hydroxide into a beaker, cover it with a lid, and dry it in a blast drying oven at a drying temperature of 100° C. for 15 hours;

(6) Ball-mill the dried indium hydroxide solid sample, wherein the ball mill turns forward for 30 minutes, and then reverses for 30 minutes, with an interval of 3 minutes in between, and wherein, the rotating speed of the ball mill is 250 rpm, and the ball-milling goes on for 20 hours;

(7) The ball-milled indium hydroxide powder material is calcined at 1,100° C. with a calcination temperature increase rate of 5° C./min and a holding time of 3 hours; and then it is cooled to the room temperature to obtain an indium oxide spherical powder.

Figure 1:
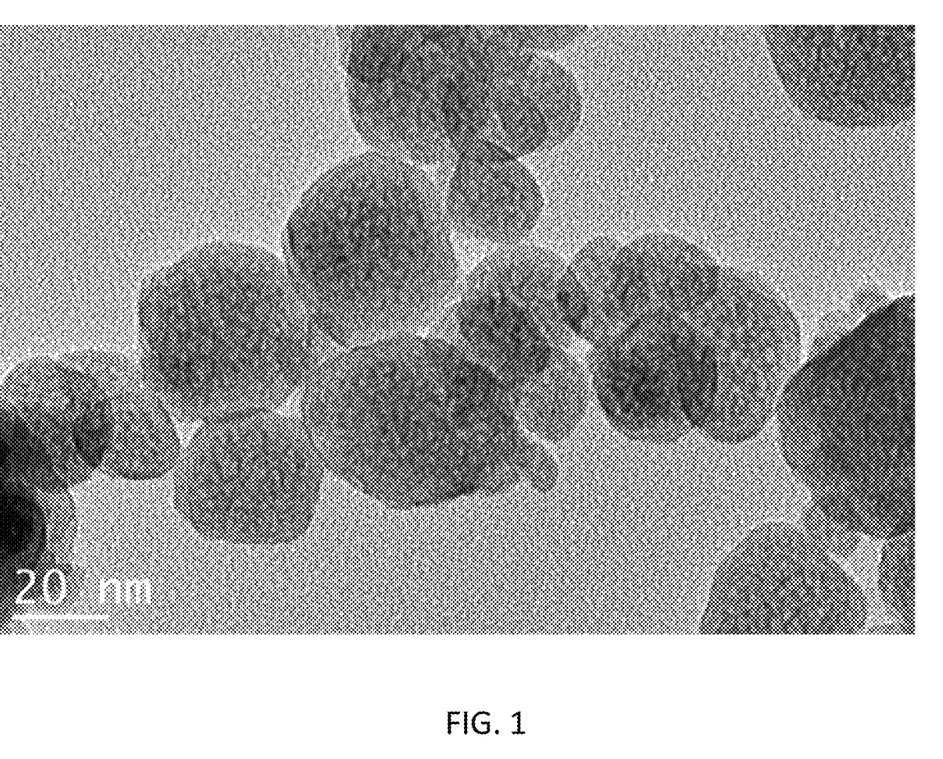
FIG. 1 is a TEM diagram of the indium hydroxide precursor particles prepared in embodiment 1.
Figure 2:
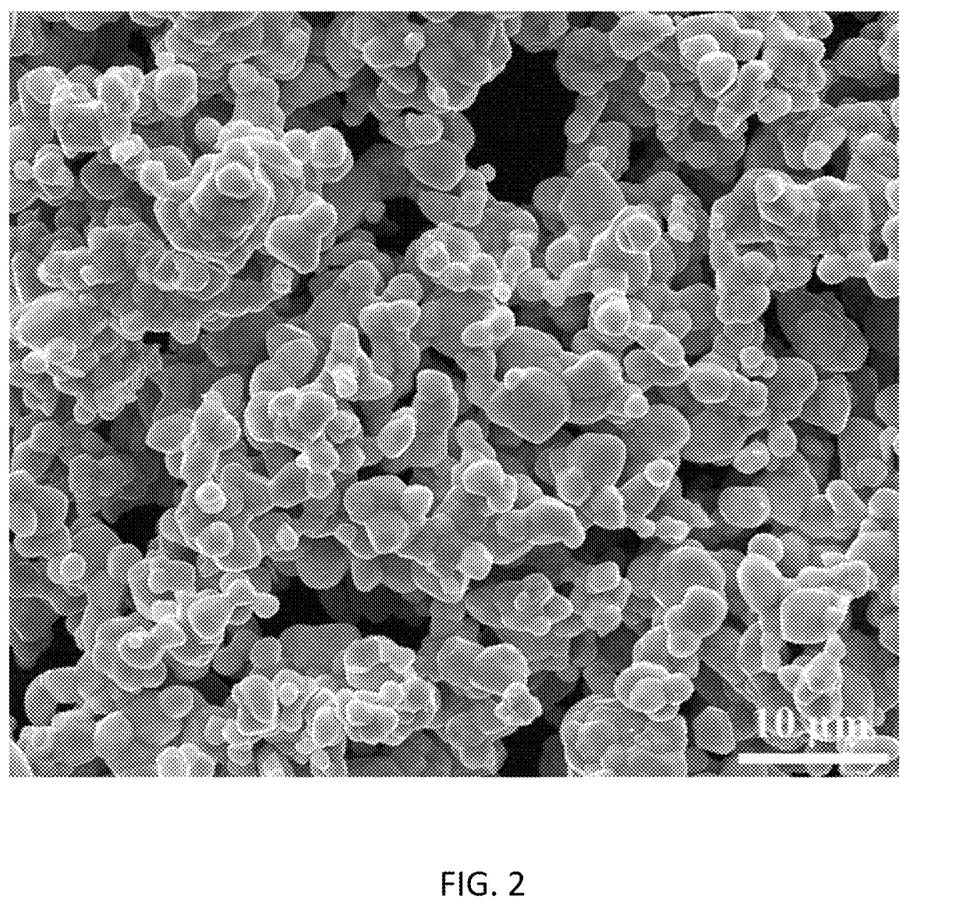
FIG. 2 is a SEM diagram of the indium oxide spherical powder particles prepared in embodiment 1.
Figure 3:
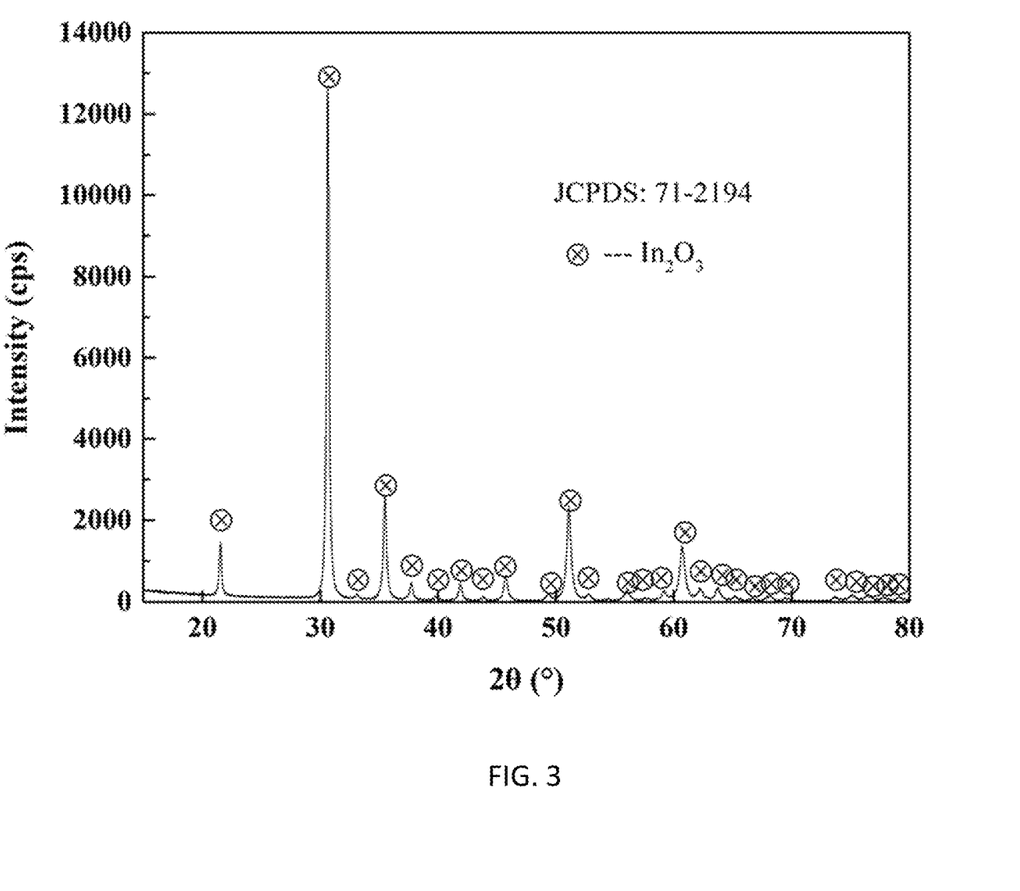
FIG. 3 is an XRD diagram of the indium oxide spherical powder particles prepared in embodiment 1.

FIG. 1 is a TEM diagram of the In(OH)$_3$ precursor particles obtained in this embodiment 1. It can be seen that through the setting and effective control of the reaction system, nearly spherical indium hydroxide precursor particles are obtained with a typical size of about 15~30 m and uniform dispersion, achieving the purpose of controlling the morphology and size of the precursor particles. FIG. 2 is a SEM diagram of the In$_2$O$_3$ powder material prepared in this embodiment 1, in which from its organizational morphology one can see that, the In$_2$O$_3$ powder disperses well, the morphology of the powder particles is close to spherical, the typical particle size is about 1~3 μm, and the particle size is fairly uniform. FIG. 3 is an XRD diagram of the powder material prepared in this embodiment 1. The abscissa 2θ represents the diffraction angle, and the ordinate Intensity represents the diffraction intensity. It can be seen that the diffraction peak of the obtained In$_2$O$_3$ powder is exactly the same as that in the standard card and there is no other impure phase peak. At the same time, the diffraction peak is very sharp, indicating that the obtained In$_2$O$_3$ powder has rather high purity and excellent crystallization performance as well.

Embodiment 2

The process of preparing indium oxide spherical powder particles with a controllable grain shape disclosed in this embodiment 2 includes the following actions to:

(1) Dissolve the metal indium with 45% sulfuric acid solution and 65% nitric acid solution to obtain a mixed solution containing indium ions. The volume ratio of nitric acid to sulfuric acid is set to 1.5:1. It specifically includes the following actions to:

(1-1) Cut 30 grams of metal indium into small pieces and put them into a dissolution tank;

(1-2) Add the sulfuric acid solution with a concentration of 45%, and control the reaction temperature at 75° C.;

(1-3) After an interval of 6 minutes, slowly add the nitric acid solution at a rate of 18 ml/min and control the reaction temperature at 60° C.;

(1-4) After the reaction progresses gradually, stir the solution with a magnetic stirrer at a stirring speed of 400 rpm, to obtain a clear and transparent mixed solution.

(2) Adjust, with pure water, the concentration of indium ions in the mixed solution to 0.6M;

(3) Add ammonia water with a concentration of 26% to the mixed solution to have a precipitation reaction with the reaction temperature controlled at 35° C., until the pH value of the solution is 9, and then the solution is precipitated and aged with the aging time of 15 hours, to obtain indium hydroxide slurry;

(4) Filter and wash, with pure water and through a ceramic membrane, the indium hydroxide slurry; first wash the ceramic membrane with pure water, and then put the slurry into a ceramic membrane pressure filter for filtration and washing, and continue to wash with pure water, until the pH value of the washed filtrate is 7.7 and its conductivity is less than 50 μS/cm, and end the washing to obtain a solid sample of indium hydroxide;

(5) Put the washed solid sample of indium hydroxide into a beaker, cover it with a lid, and dry it in a blast drying oven at a drying temperature of 110° C. for 21 hours;

(6) Ball-mill the dried indium hydroxide solid sample, wherein the ball mill turns forward for 30 minutes and then reverses for 30 minutes with an interval of 3 minutes in between, the rotating speed of the ball mill is 180 rpm, and the ball-milling goes on for 35 hours;

(7) The ball-milled indium hydroxide powder material is calcined at 800° C. with a calcination temperature increase rate of 3° C./min and a holding time of 7 hours; then it is cooled to the room temperature to obtain an indium oxide spherical powder.

The In$_2$O$_3$ powder material prepared in this embodiment 2 is analyzed by the TEM, SEM diagrams and XRD diffraction. The morphology of the In(OH)$_3$ precursor and In$_2$O$_3$ powder particles is close to spherical, and the typical In$_2$O$_3$ powder particle size is about 0.5~2.1 μm, with high purity, good dispersion and excellent crystallization performance.

Embodiment 3

The process of preparing indium oxide spherical powder particles with a controllable grain shape disclosed in this embodiment 3 includes:

In some embodiments, the method of preparing an indium oxide spherical powder with a controllable grain shape comprises the following actions or steps to:

(1) Dissolve the metal indium with 50% sulfuric acid solution and 67% nitric acid solution to obtain a mixed solution containing indium ions. The volume ratio of nitric acid to sulfuric acid is set to 1:1. It specifically includes the following actions to:

(1-1) Cut 30 grams of metal indium into small pieces and put them into a dissolution tank;

(1-2) Add the sulfuric acid solution with a concentration of 50%, and control the reaction temperature at 70° C.;

(1-3) After an interval of 8 minutes, slowly add the nitric acid solution at a rate of 8 ml/min and control the reaction temperature at 70° C.;

(1-4) After the reaction progresses gradually, stir the solution with a magnetic stirrer at a stirring speed of 600 rpm, to obtain a clear and transparent mixed solution.

(2) Adjust, with pure water, the concentration of indium ions in the mixed solution to 0.5M;

(3) Add ammonia water with a concentration of 27% to the mixed solution to have a precipitation reaction with the reaction temperature controlled at 45° C., until the pH value of the solution is 10, and then the solution is precipitated and aged with the aging time of 24 hours, to obtain indium hydroxide slurry;

(4) Filter and wash, with pure water and through a ceramic membrane, the indium hydroxide slurry; first wash the ceramic membrane with pure water, then put the slurry into a ceramic membrane pressure filter for filtration and washing, and continue to wash with pure water, until the pH value of the washed filtrate is 7.5 and its conductivity is less than 50 μS/cm, and end the washing to obtain a solid sample of indium hydroxide;

(5) Put the washed solid sample of indium hydroxide into a beaker, cover it with a lid, and dry it in a blast drying oven at a drying temperature of 115° C. for 25 hours;

(6) Ball-mill the dried indium hydroxide solid sample, wherein the ball mill turns forward for 30 minutes and then reverses for 30 minutes with an interval of 3 minutes in between, the rotating speed of the ball mill is 300 rpm, and the ball-milling goes on for 15 hours;

(7) The ball-milled indium hydroxide powder material is calcined at 900° C. with a calcination temperature increase rate of 4° C./min and a holding time of 5 hours; then it is cooled to the room temperature to obtain an indium oxide spherical powder.

The $In_2O_3$ powder material prepared in this embodiment 3 is analyzed by the TEM, SEM diagrams and XRD diffraction. The morphology of the $In(OH)_3$ precursor and $In_2O_3$ powder particles is close to spherical, and the typical $In_2O_3$ powder particle size is about 0.46~2.5 μm, with high purity, good dispersion and excellent crystallization performance.

Comparative Example 1

The process of preparing indium oxide powder particles disclosed in the comparative example 1 includes the following actions to:

(1) Dissolve the metal indium with 65% nitric acid solution and control the reaction temperature at 60° C. to obtain a mixed solution containing indium ions;

(2) Adjust, with pure water, the concentration of indium ions in the mixed solution to 0.5M;

(3) Add a concentration 25% of ammonia water to the mixed solution for precipitation reaction with the reaction temperature controlled at 25° C., until the pH value of the solution is 9, and then the solution is precipitated and aged with the aging time of 15 hours, to obtain an indium hydroxide slurry;

(4) Filter and wash, with pure water and through a ceramic membrane, the indium hydroxide slurry; first wash the ceramic membrane with pure water, then put the slurry into a ceramic membrane pressure filter for filtration and washing, and continue to wash with pure water, until the pH value of the washed filtrate is 7.6 and its conductivity is less than 50 μS/cm, and end the washing to obtain a solid sample of indium hydroxide;

(5) Put the washed solid sample of indium hydroxide into a beaker, cover it with a lid, and dry it in a blast drying oven at a drying temperature of 100° C. for 15 hours;

(6) Ball-mill the dried indium hydroxide solid sample, wherein the ball mill turns forward for 30 minutes and then reverses for 30 minutes with an interval of 3 minutes in between, the rotating speed of the ball mill is 250 rpm, and the ball-milling goes on for 20 hours;

(7) The ball-milled indium hydroxide powder material is calcined at 800° C. with a calcination temperature increase rate of 5° C./min and a holding time of 5 hours; then it is cooled to the room temperature to obtain an indium oxide spherical powder.

Figure 4:
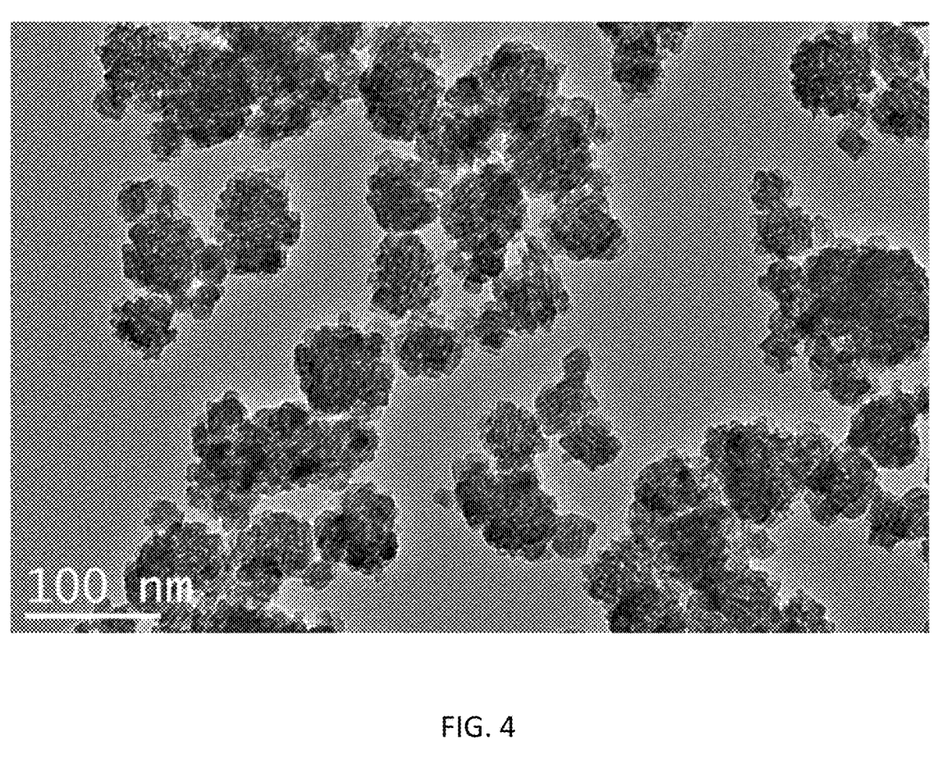
FIG. 4 is a TEM diagram of the indium hydroxide precursor particles prepared in comparative example 1.

In this comparative example 1, only nitric acid is used to prepare the $In_2O_3$ powder material. The morphology of the precursor is shown in FIG. 4. The obtained powder has irregular morphology which can be lumpy or slatted, and the agglomeration is also serious. This is mainly caused by the reaction system and its instability, but in examples 1~3, due to the effective control of the mixed system, a uniformly distributed and nearly spherical precursor is obtained, so that an ideal indium oxide powder is finally obtained.

Comparative Example 2

The process of preparing indium oxide spherical powder particles disclosed in the comparative example 2 includes the following actions to:

(1) Dissolve the metal indium with 55% sulfuric acid solution and 65% nitric acid solution to obtain a mixed solution containing indium ions. The volume ratio of nitric acid to sulfuric acid is set to 3:1. It specifically includes the following actions to:

(1-1) Cut 30 grams of metal indium into small pieces and put them into a dissolution tank;

(1-2) Add a concentration 55% of sulfuric acid solution, and control the reaction temperature at 75° C.;

(1-3) After an interval of 6 minutes, slowly add the nitric acid solution at a rate of 30 ml/min and control the reaction temperature at 70° C.;

(1-4) After the reaction progresses gradually, stir the solution with a magnetic stirrer at a stirring speed of 400 rpm, to obtain a clear and transparent mixed solution.

(2) Adjust, with pure water, the concentration of indium ions in the mixed solution to 0.8M;

(3) Add a concentration 25% of ammonia water to the mixed solution to have a precipitation reaction with the reaction temperature controlled at 25° C., until the pH value of the solution is 9.3, and then the solution is precipitated and aged with the aging time of 15 hours, to obtain an indium hydroxide slurry;

(4) Filter and wash, with pure water and through a ceramic membrane, the indium hydroxide slurry; first wash the ceramic membrane with pure water, then put the slurry into a ceramic membrane pressure filter for filtration and washing, and continue to wash with pure water, until the pH value of the washed filtrate is 7.7 and its conductivity is less than 50 μS/cm, and end the washing to obtain a solid sample of indium hydroxide;

(5) Put the washed solid sample of indium hydroxide into a beaker, cover it with a lid, and dry it in a blast drying oven at a drying temperature of 110° C. for 21 hours;

(6) Ball-mill the dried indium hydroxide solid sample, wherein the ball mill turns forward for 30 minutes and then reverses for 30 minutes with an interval of 3 minutes in between, the rotating speed of the ball mill is 240 rpm, and the ball-milling goes on for 18 hours;

(7) The ball-milled indium hydroxide powder material is calcined at 900° C. with a calcination temperature increase rate of 3° C./min and a holding time of 4 hours; then it is cooled to the room temperature to obtain an indium oxide spherical powder.

Figure 5:
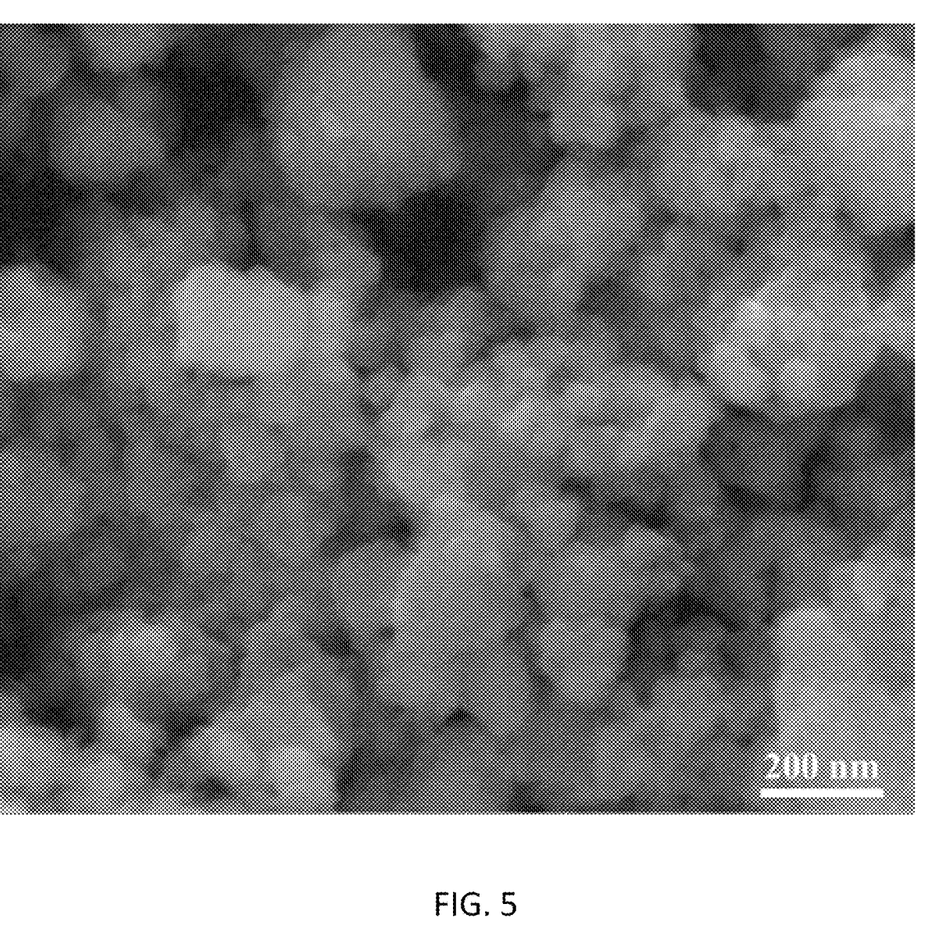
FIG. 5 is a SEM diagram of the indium hydroxide precursor particles prepared in comparative example 2.

This comparative example 2 uses the preparation method of the present disclosure to prepare $In_2O_3$ powder material, the concentration of metal indium ions is controlled to 0.8M, the volume ratio of nitric acid to sulfuric acid is set to 3:1, and the nitric acid solution is added at a rate of 30 ml/min. The morphology of the prepared precursor is shown in FIG. 5. The powder morphology particle size obtained by the preparation is not uniform, the particle difference is large and the agglomeration is rather serious. However, in embodiments 1~3, due to the effective control of the mixed system, a uniformly distributed and nearly spherical precursor is obtained, so that an ideal indium oxide powder is finally obtained.

The preparation method of the indium oxide spherical powder disclosed in the embodiments of the present application uses a mixed system of sulfuric acid and nitric acid to react with the metal indium and adjust the state of the solution, which can effectively control the reaction speed for forming a precursor and the morphology distribution. The preparation process does not need to use dispersant or chelating agent, and less impurity ions are introduced. The process is simple, and the preparation cost is low, safe and reliable. The product spherical particle has regular morphology, high purity, good dispersion, and excellent crystallization, being an excellent material for preparing target materials.

The technical details disclosed in the embodiments and the technical solutions disclosed by this application are merely illustrations of the concept of this application, and do not constitute limitations to this application. Non-creative changes made to the technical details disclosed in this application all have the same inventive concept as this application, and all fall within the protection scope of the claims of this application.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method of preparing an indium oxide spherical powder, comprising:
    (1) reacting a sulfuric acid solution having a concentration of 35~50%, with metal indium for a certain period of time, and then adding a nitric acid solution having a concentration of 65~68%, to react with the metal indium to obtain a mixed solution system containing indium sulfate and indium nitrate;
    (2) adjusting a concentration of indium ions in the mixed solution system between 0.45~0.6M;
    (3) performing a precipitation reaction of the mixed solution system with a certain concentration of precipitant until a pH value of the solution system is between 9~10, and then precipitating and aging the solution system for a certain time to obtain an indium hydroxide precursor slurry;
    (4) using a ceramic membrane to filter and wash the indium hydroxide precursor slurry, until a pH value of a washed filtrate is between 7~8 and its conductivity is less than or equal to 50 μS/cm, and ending the washing to obtain a purified precursor sample;
    (5) drying the purified precursor sample at 80~130° C.; and
    (6) ball-milling the dried precursor sample, and then calcining the ball-milled precursor at a set calcination temperature to obtain the indium oxide powder.

2. The method of preparing the indium oxide spherical powder according to claim 1, wherein a volume ratio of the nitric acid solution to the sulfuric acid solution is set to 2:1~1:1.

3. The method of preparing the indium oxide spherical powder according to claim 1, wherein an addition rate of the nitric acid solution is controlled between 0.1~0.6 ml/min per g of the metal indium.

4. The method of preparing the indium oxide spherical powder according to claim 1, wherein the reacting the sulfuric acid solution and then the adding the nitric acid solution, comprises:
    (1-1) cutting a portion of the metal indium into small pieces and putting them in a container;
    (1-2) adding the sulfuric acid solution, and controlling a reaction temperature between 70~95° C.;
    (1-3) after an interval of 3~10 minutes, adding the nitric acid solution at a set rate, and controlling the reaction temperature between 60~75° C.;
    (1-4) after reaction progresses, stirring to obtain a uniform mixed solution system.

5. The method of preparing the indium oxide spherical powder according to claim 4, wherein the container includes high borosilicate glass as its inner wall material.

6. The method of preparing the indium oxide spherical powder according to claim 1, wherein ammonia water is selected as the precipitant, a concentration of the ammonia water is set to 25~27%, a temperature of the precipitation reaction is controlled between 25~45° C., and time for precipitating and aging is set to 10~24 hours.

7. The method of preparing the indium oxide spherical powder according to claim 1, wherein a ball mill rotating speed for ball-milling the precursor sample is set to 180~300 rpm, and a ball-milling time is set to 15~35 hours.

8. The method of preparing the indium oxide spherical powder according to claim 1, wherein a holding time for calcination of the ball-milled precursor powder material is set to 3~7 hours.

9. The method of preparing the indium oxide spherical powder according to claim 1, wherein a heating rate to the calcination temperature is set to 3~5° C./min.

* * * * *